July 24, 1962 P. S. MARTIN 3,046,453
CIRCUIT BREAKERS AND ENCLOSURES THEREFOR
Filed Sept. 19, 1958 2 Sheets-Sheet 1

United States Patent Office 3,046,453
Patented July 24, 1962

3,046,453
CIRCUIT BREAKERS AND ENCLOSURES
THEREFOR
Paul S. Martin, Flushing, N.Y., assignor to Federal Pacific Electric Company, a corporation of Delaware
Filed Sept. 19, 1958, Ser. No. 762,155
8 Claims. (Cl. 317—119)

The present invention relates to improvements in circuit breakers and circuit breaker enclosures, particularly of the plug-in type.

Panelboard enclosures are generally manufactured as highly flexible units of modular design so as to receive circuit breakers of any desired ratings requisite for the installation, within a wide range of ratings, and the circuit breakers themselves are physically interchangeable in the enclosure, regardless of rating within a board range. In wiring such a panelboard enclosure, a circuit breaker should be selected to protect each protected branch circuit corresponding to its wire gauge. In such enclosure a circuit breaker may trip frequently due to circuit overloading, and to avoid the resulting inconvenience the user may substitute a heavier circuit breaker in the space occupied by the replaced breaker. The original purpose of the circuit breaker may be thus defeated and the replacement heavier breaker will not trip when a sustained excessive current is carried by the improperly protected branch-circuit wire.

It is accordingly the primary aim and object of the present invention to provide improved circuit breakers and enclosures therefor which are constructed to prevent the easy indiscriminate later substitution of circuit breakers of heavy ratings in place of the previously installed circuit breakers of lower ratings. Pursuant to this object of the present invention, the enclosure includes a trim plate having circuit breaker receiving regions each of which is readily converted to receive only circuit breakers of a selected rating, the circuit breakers themselves having structure characteristic of the rating thereof complementary to their companion circuit breaker receiving regions so as to be received only in said regions. In this way worn out or defective circuit breakers can be readily replaced by others of corresponding ratings but a panelboard enclosure which was originally designed for receiving any rating of circuit breaker (within a wide range) in any of the circuit breaker receiving regions may be readily converted so as to make the installed circuit breakers of any ratings not interchangeable with circuit breakers of different ratings.

A further and related object of the present invention is the provision in a circuit breaker enclosure of the aforedescribed character of visual indicia viewable from a frontal position of the enclosure which identifies the particular ratings of the circuit breaker receiving regions and the circuit breakers thereat. An ancillary feature of this object of the present invention is that if an improper circuit breaker substitution is made either by tampering with, or damaging, the trim plate and/or circuit breaker that fact will be readily revealed on viewing the circuit breaker receiving regions of the trim plate.

Another object of the present invention is the provision of circuit breakers of different rating classifications of generally identical outline having characteristic provisions corresponding to the rating classifications thereof whereby circuit breakers of corresponding rating will be interchangeable and conversely circuit breakers of non-corresponding rating will be non-interchangeable. In accordance with one embodiment of the present invention, the characteristic structure identified with the rating classification of the breakers is identical in the breakers with such structure being differently disposed on the breakers of different ratings and such disposition being factory set on breaker assembly to prevent subsequent resetting for purposes of improper breaker substitution.

Yet another object of the present invention is the provision of generally improved circuit breakers and enclosures therefor of the aforenoted character which are eminently suitable for the accomplishment of their intended purposes.

The present invention has application to the two types of circuit breakers which are presently in wide use, namely to those having screw-connectors for both the protected branch circuit and for the bus, respectively, as well as to the plug-in type of circuit breaker usually having a screw connector for the protected branch circuit and having a plug-in terminal for the bus of the panelboard enclosure.

The nature of the invention and its further features and advantages will be more fully appreciated from the following detailed description of illustrated embodiments thereof, which are shown in the accompanying drawings forming a part of the disclosure of the invention.

Figure 1:
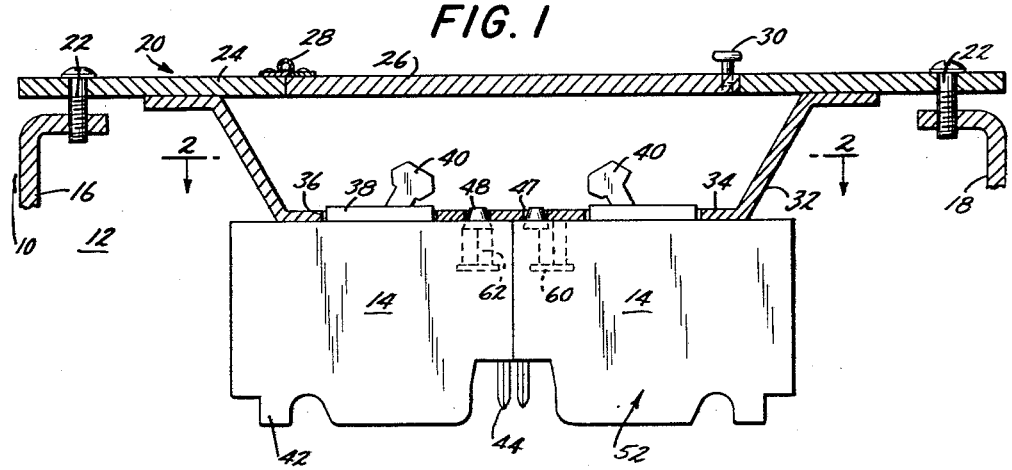
FIG. 1 is a side elevational view, partly in section, of an enclosure formed according to one embodiment of the present invention.

Referring to the drawings, and more particularly to FIGS. 1–4 thereof, there is shown a forward portion of a circuit breaker enclosure 10 defining a compartment 12 for housing the circuit breakers 14 which are secured therein in any well known manner. The enclosure 10 is generally of sheet metal construction and includes the opposite side walls 16 and 18 to which the front trim device 20 is secured as by means of the bolts 22. The trim device 20 includes a front panel 24 having a door 26 hingedly mounted at 28, the door having a handle 30 for facilitating the opening and closing thereof. Secured to the panel 24 in any suitable manner, as by means of welding, is a front trim plate 32 having a flat portion 34 which abuts the circuit breakers. The wall 34 is provided with openings 36 at the circuit breaker receiving regions R to accommodate the forwardly projecting portions 38 of the circuit breakers which interfit in said openings. The front trim plate prevents access to the interior of the enclosure but provides access to the operating handles 40 of the circuit breakers when the door 26 is open. It will be understood that the circuit breakers are plugged into a panelboard (not shown) which may be of any suitable design and construction for electrically and mechanically connecting the circuit breakers individually in the regions R in the enclosure. Thus each circuit breaker includes at the rear thereof a mechanical securing means 42 at one end and a plug-in terminal connection 44 at the other end. Patent No. 2,647,225, assigned to the assignee hereof, illustrates suitable panelboard details.

Figure 2:
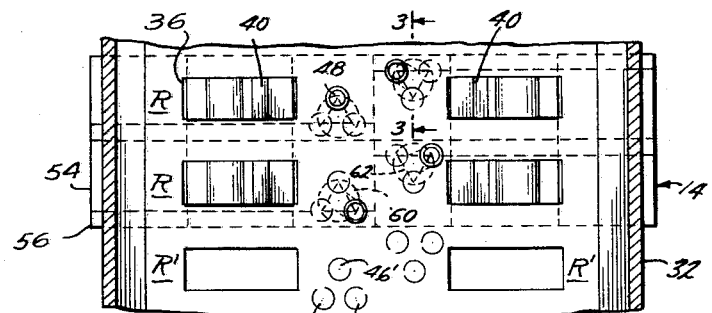
FIG. 2 is a sectional view taken on the line 2—2 of FIG. 1.

Pursuant to the present invention, at each region R of the trim plate 34 adjacent opening 36 there is provided a series of three triangularly arranged knockouts 46, 46' and 46″ of identical size and construction corresponding to the three different circuit breaker ratings exemplified in the illustrated embodiment. Any desired number of knockouts may be provided in accordance with the range of circuit breaker ratings to be accommodated at each region. In practice, a selected one of said knockouts is adapted to be removed to thereby classify the region according to the rating classification of a mating circuit breaker, the removed knockout defining an opening 47 to accommodate the terminal end part 48 of the circuit breaker projecting part 50 whose disposition is characteristic of the rating of the breaker. Thus the knockouts at each region R are initially in place in the trim plate as supplied and at each region to be used for a circuit breaker installation a selected knockout is removed to classify the region at the desired rating in accordance with a circuit breaker designed to interfit therewith as will be described in detail below. In FIG. 2 the regions R' are shown with their knockouts in place and the regions R have a selected knockout removed to accommodate a companion mating circuit breaker.

Figure 3:
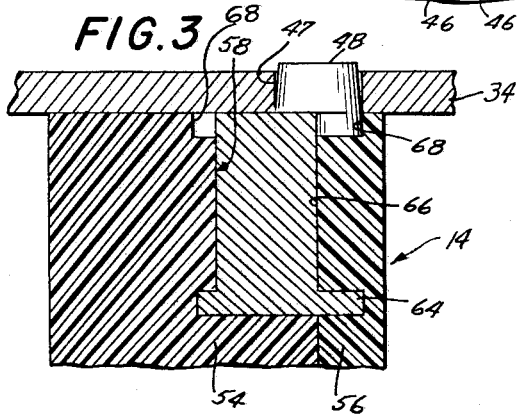
FIG. 3 is a sectional view, on an enlarged scale, taken on the line 3—3 of FIG. 2.
Figure 4:
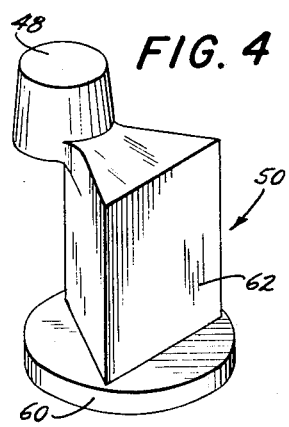
FIG. 4 is a perspective view of a circuit breaker projecting part whose disposition is characteristic of the circuit breaker rating.
Figure 5:
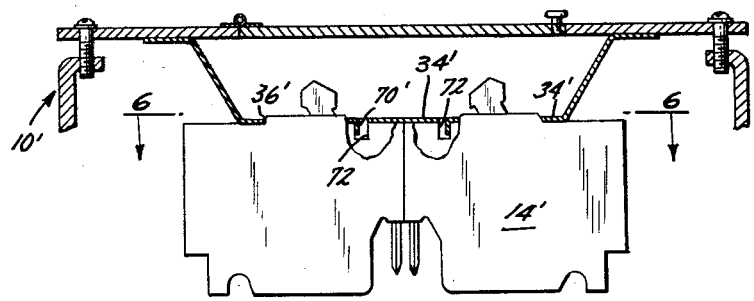
FIG. 5 is a view similar to FIG. 1 showing another embodiment of the present invention.
Figure 6:
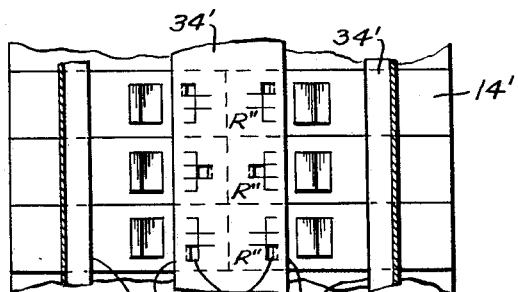
FIG. 6 is a sectional view taken on the line 6—6 of FIG. 5.

Circuit breaker 14 is basically of conventional construction and outline and the casing 52 thereof comprises a receptacle part 54 and cover 56 which are suitably secured to each other. A recess 58 is defined in the receptacle part 54 to receive a companion projecting rating classifying part 50, which is preferably of metal. Part 50 comprises a circular base 60 and triangular body part 62 which are formed complementary to the recess portions 58 and 66, respectively, of the two parts 54 and 56 of casing 52. Thus the recess 58, closed off by cover 56, is of equilateral triangular configuration to receive part 62 in any one of three registered positions. The terminal end part 48 is exposed externally of the casing and is laterally offset from the center of body part 62 as best shown in FIGS. 3 and 4. The casing 52 is provided with a recess 68 to receive part 48 in all the different possible dispositions thereof. In the illustrated embodiment the disposition of part 50 characterizes the circuit breaker rating classification. Part 50 may be interlocked between the casing parts in any one of three dispositions, 120 degrees apart from each other. The number of possible choices for the orientation of this part 50 relative to the casing depends on the number of corners of the casing recess 58 in which portion 62 is fixed. Body portion 62 is shown as of equilateral cross-section; but it could obviously be square to provide four rating classifications. Any suitable number of corners is contemplated, it being required only that the part 50 should be keyed in the recess 58 in the required number of selective rating-classification positions. While it is preferred to make body portion 62 complementary to recess 58, this is not essential. Thus, for example, a triangular body part 62 could be used in a hexagonal recess 58 to establish six possible rating classifications. The disposition of part 50 is permanently factory set on assembly of the breaker and breakers of like rating will have their parts 50 in like disposition and will thus be interchangeable while breakers of unlike rating will be non-interchangeable. The part 48 is adapted to register with one of the knockouts 46, 46' and 46″ in accordance with the disposition of the part 50 and the rating of the breaker, and one knockout is removed at the region to receive the particular breaker to classify the region to the desired rating, the breaker of corresponding rating having its part 48 disposed to interfit in the opening 47 defined by the removed knockout on breaker assembly in the enclosure. Different region rating classifications are illustrated in FIG. 2 with companion breakers assembled with the trim plate with the parts 48 interfitting in companion openings 47 of the trim plate. The parts 48 are circular and tapered to facilitate entry into the openings 47. Worn out or defective circuit breakers can thus be readily replaced by others of corresponding ratings in the corresponding classified region because of like disposition of parts 48.

Parts 48 define visual indicia viewable from a frontal position of the trim plate which identifies the particular ratings of the circuit breaker receiving regions and the circuit breakers thereat. Thus without any requirement of parts disassembly for inspection the rating classifications of the different breakers are revealed and these ratings can be readily matched against the companion protected branch circuits for proper wire gauge. An improper breaker substitution will be rejected by the knockouts remaining in place and if a second knockout is removed to alter the classification of the region this will be readily apparent on visual inspection of the trim plate. Similarly should an improper breaker substitution be attempted by breaking off part 48, the opening 47 at such region will remain unfilled which will also be readily apparent on visual inspection of the trim plate. Thus an improper breaker substitution will be rejected at the region and a substitution effected as aforedescribed will be readily revealed on visual inspection. In an unused region the knockouts will be left intact so that such region may be later classified in accordance with the requirements of the user. Thus each of the circuit breaker receiving regions may be classified as desired within the range provided, it being understood that any desired number of different dispositions of part 50 and companion knockouts in the trim plate may be provided, as desired, within a very broad range. From the above it will be apparent that the part 48 of the breakers are selectively permanently positioned on breaker assembly and said part will be exposed at the trim plate on breaker installation in a corresponding classified region of the enclosure.

Figure 7:
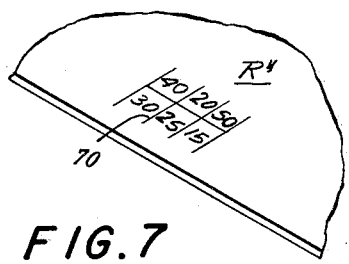
FIG. 7 is a fragmentary perspective view showing a portion of the trim plate and a set of scored portions thereof.
Figure 8:
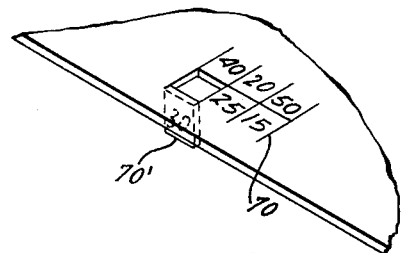
FIG. 8 is a view similar to FIG. 7 showing one of the scored portions bent down to define a depending flange.

With reference to FIGS. 5–8, there is shown a modified form of the present invention which differs from the above described embodiment in the manner to be described in detail below. The enclosure 10' is identical with enclosure 10 except for the trim plate or wall 34', the latter having circuit breaker receiving regions R″ corresponding to the regions R referred to above provided with a series of scored portions 70 adjacent to the trim plate opening 36'. The scored portions 70 of each series correspond to different current ratings and each region to be classified is classified according to the rating classification of a mating circuit breaker 14' by displacing or striking down a selected portion 70 corresponding to such circuit breaker rating, the struck down portion defining a depending flange 70' which is adapted to interfit with a companion relief 72 of said circuit breaker 14'. In the illustrated embodiment each region is provided with a series of six scored portions 70 with the designated ratings ranging from 15 to 50 amperes, it being understood that such series may have any desired number of scored portions which may bear any desired designations. Thus the scored portions are initially in place in the trim plate as supplied and at each region to be used for a circuit breaker installation a selected portion 70 is struck down to define a flange 70' and to classify the region at the desired rating in accordance with a circuit breaker 14' designed to receive such flange on the installation thereof with respect to the trim plate. In FIG. 7 the portions 70 are shown in place while in FIG. 8 the 30 amperes portion is shown struck down to correspondingly classify the region to receive a 30 amperes breaker 14'. The circuit breakers 14' correspond to the circuit breakers 14 previously described except circuit breakers 14' make no provision for parts 50 which are not used in conjunction with such breakers. The circuit breakers 14' are each provided with a recess or relief 72 in the front wall 74 thereof, the disposition of the reliefs being characteristic of the circuit breaker rating. Thus the different rated breakers differ solely in the disposition of their reliefs 72 which are adapted to receive companion registering flanges 70' at regions of like rating classifications. For example a breaker 14' of 30 amperes rating will have its relief 72 disposed to receive flange 70' shown in FIG. 8 on the installation of said breaker at such region. The cavities 72 may be provided directly in the breaker casings on the molding thereof, the cavities being distinctly positioned in the casings in accordance with the ratings of the breakers. Advantageously, to avoid the use of different casings for each different rating classification, standard cases and covers for all ratings may be provided with an insert like insert 50 of the species in FIGS. 1–4, including a circular head centered on the body portion 62, classifying projection 48 of FIGS. 1–4 being replaced by an off-center cavity that is then distinctively located for determining the rating classification in the same manner as is illustrated in the case of projection 48.

The cavities 72 and their companion flanges 70' define visual indicia viewable from a frontal position of the trim plate which identifies the particular ratings of the circuit breaker receiving regions and the circuit breakers thereat. An improper breaker substitution will be rejected by the flange 70' which will be disposed to prevent such improper substitution and if such flange is removed to permit such improper substitution this fact will be readily apparent on visual inspection of the trim plate.

Various additional modifications of the above embodiments of the invention will readily occur to those skilled in the art, and therefore the invention should be broadly construed in accordance with its full spirit and scope.

Having thus described my invention what I claim as new and desire to secure by Letters Patent is:

1. A circuit breaker panelboard, including a row of side-by-side circuit breakers, all the circuit breakers of the row having panelboard connecting terminals aligned with each other and having aligned forward-projecting portions comprising respective operating handles, and an enclosure containing and mounting said circuit breakers, said enclosure including a trim plate having openings therein corresponding to and receiving said aligned forward-projecting circuit-breaker portions, said panelboard having means defining a series of circuit-breaker mounting regions and said trim plate having rating classification means in each of said regions, said means of each region comprising a group of distinctively located discrete rating classification formations and said means comprising displaceable rating-classification devices contained by certain of said formations and others of said formations being at least partly clear of such displaceable rating classification devices, the rating classification of any one of said circuit-breaker mounting regions being established by the conditions of its respective formations as either containing or being at least clear of displaceable devices, said circuit breakers having rating classification means cooperating with and complementary to the rating classification means of the trim plate in the corresponding spaces.

2. A panelboard in accordance with claim 1, wherein said displaceable rating-classification devices are integral tongue portions of said trim plate and are either flush with the trim plate or project selectively toward the underlying circuit breakers in corresponding regions, and wherein said circuit breakers have relatively depressed portions and raised portions complementary to the rating classification means of the trim plate in the respective circuit-breaker mounting regions.

3. A panelboard in accordance with claim 1, wherein said rating classification devices are knock-outs and wherein said rating classification means of said circuit breakers are projections received in formations free of knock-outs.

4. A circuit breaker enclosure including means defining at least one mounting region for a circuit breaker, said enclosure having a trim plate provided with an opening for the forward-projecting operating-handle portion of a circuit breaker that may be mounted in said region, and said trim plate having in said region a group of distinctively located and selectively displaceable rating-classification devices disposed as a group to one side of said opening, whereby said region may be selectively identified with circuit breakers of various particular rating classifications that are characterized by distinctively located circuit breaker rating-classification formations by selectively displacing said group of rating classification devices.

5. A circuit breaker enclosure in accordance with claim 4, wherein said trim plate is of sheet-metal and said group of selectively displaceable devices are portions of said sheet-metal incompletely parted therefrom prior to the aforesaid selective displacement thereof.

6. A circuit breaker comprising a casing including a companion pair of walls having a multiple-cornered cavity therebetween, and a rating classification member interlocked between said casing walls and having a body portion selectively angularly positionable in said cavity relative to the center of said cavity, said classification member having a distinctively oriented exposed portion offset from the center of said body portion, to identify the rating classification of the breaker.

7. A circuit breaker comprising a casing including confronting walls, and a rating classifying member interlocked between said walls, said member having a body portion provided with corners distributed equally about a center and an external portion offset from said center, said confronting walls having a recess formed therebetween complementary to said body portion and adapted to receive the body portion in any one of a number of positions corresponding to the number of corners of said body portion to locate said exposed off-set portion distinctively at any one of an equal number of rating-classifying positions relative to the circuit breaker.

8. A circuit breaker comprising a casing, an operating handle projecting from said casing, said casing including a companion pair of walls having a multiple-cornered cavity therebetween adjacent said operating handle, and a rating classification member interlocked between said casing walls and having a body portion selectively angularly positionable in said cavity relative to the center of said cavity, said classification member having a distinctively oriented exposed portion offset from the center of said body portion, to identify the rating classification of the breaker and being disposed laterally adjacent and viewable conjointly with said operating handle.

References Cited in the file of this patent

UNITED STATES PATENTS

| | | |
|---|---|---|
| 1,863,383 | Schmdit | June 14, 1932 |
| 2,281,958 | Snavely | May 5, 1942 |
| 2,488,710 | Cooper | Nov. 22, 1949 |
| 2,682,783 | Lawson | July 6, 1954 |
| 2,767,353 | Kingdon | Oct. 16, 1956 |
| 2,767,354 | Jackson et al. | Oct. 16, 1956 |
| 2,883,587 | Dorfman et al. | Apr. 21, 1959 |
| 2,916,675 | Middendorf | Dec. 8, 1959 |
| 2,928,998 | Brumfield | Mar. 15, 1960 |
| 2,929,966 | Bangert | Mar. 22, 1960 |

FOREIGN PATENTS

| | | |
|---|---|---|
| 92,617 | Germany | July 7, 1897 |